United States Patent
Bringuier et al.

(10) Patent No.: US 9,547,147 B2
(45) Date of Patent: Jan. 17, 2017

(54) FIBER OPTIC CABLE WITH EXTRUDED TAPE

(71) Applicant: Corning Optical Communications LLC, Hickory, NC (US)

(72) Inventors: Anne Germaine Bringuier, Taylorsville, NC (US); Matthew Fitzgerald, Hickory, NC (US); Warren Welborn McAlpine, Hickory, NC (US); Joel Laine Parker, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 50 days.

(21) Appl. No.: 14/136,311

(22) Filed: Dec. 20, 2013

(65) Prior Publication Data

US 2015/0177471 A1 Jun. 25, 2015

(51) Int. Cl.
*G02B 6/44* (2006.01)

(52) U.S. Cl.
CPC .......... *G02B 6/4494* (2013.01); *G02B 6/4486* (2013.01); *Y10T 29/49801* (2015.01)

(58) Field of Classification Search
None
See application file for complete search history.

(56) References Cited

U.S. PATENT DOCUMENTS

| | | | |
|---|---|---|---|
| 4,515,435 A | 5/1985 | Anderson | 350/96.23 |
| 5,642,452 A * | 6/1997 | Gravely | G02B 6/4433 385/112 |
| 5,703,983 A | 12/1997 | Beasley, Jr. | 385/104 |
| 6,483,971 B2 | 11/2002 | Gaillard et al. | 385/113 |
| 6,546,712 B2 | 4/2003 | Moss et al. | 57/293 |
| 6,899,776 B2 * | 5/2005 | Bahlmann | B32B 5/26 156/259 |
| 7,082,241 B2 | 7/2006 | Jamet et al. | 385/100 |
| 8,180,190 B2 * | 5/2012 | Bringuier | G02B 6/4483 385/109 |
| 8,189,974 B2 * | 5/2012 | Hashimoto | 385/109 |
| 8,620,124 B1 * | 12/2013 | Blazer | G02B 6/4489 385/102 |
| 8,682,123 B2 * | 3/2014 | Parris | 385/100 |
| 8,909,014 B2 * | 12/2014 | Gimblet et al. | 385/113 |
| 9,029,704 B2 * | 5/2015 | Jeroense | H01B 7/045 174/103 |
| 2002/0041744 A1 * | 4/2002 | Anelli | G02B 6/4433 385/112 |
| 2002/0097966 A1 * | 7/2002 | Zelesnik | F16L 9/19 385/100 |
| 2003/0035635 A1 | 2/2003 | Chastain et al. | 385/112 |
| 2004/0252954 A1 | 12/2004 | Ginocchio et al. | 385/100 |
| 2005/0180704 A1 | 8/2005 | Terry | 385/100 |
| 2006/0127015 A1 * | 6/2006 | Donetti | C08K 5/053 385/112 |

(Continued)

FOREIGN PATENT DOCUMENTS

| | | | | |
|---|---|---|---|---|
| EP | 1610163 B1 | 10/2011 | | G02B 6/44 |
| GB | 2064163 A | 6/1981 | | G02B 5/14 |

OTHER PUBLICATIONS

U.S. Appl. No. 13/790,329, filed Mar. 8, 2013, Bradley J. Blazer, 48 pages.

(Continued)

*Primary Examiner* — Sung Pak
(74) *Attorney, Agent, or Firm* — William D. Doyle

(57) ABSTRACT

A fiber optic cable includes a tape comprising a substrate of an extrudable thermoplastic, core items of the fiber optic cable, and a jacket around the tape and core items. The tape includes water-swellable material integrated therewith and the core items include one or more optical fibers. The tape is incorporated with core items such that the water-swellable material of the tape is configured to limit water from flowing lengthwise along the cable through gaps among the core item.

20 Claims, 3 Drawing Sheets

(56) References Cited

U.S. PATENT DOCUMENTS

| | | | |
|---|---|---|---|
| 2010/0067856 A1* | 3/2010 | Knoch | 385/111 |
| 2010/0189396 A1* | 7/2010 | Hashimoto | 385/112 |
| 2011/0135816 A1* | 6/2011 | Burns | B29C 47/0014 427/163.2 |
| 2012/0014652 A1* | 1/2012 | Parris | 385/111 |
| 2012/0063731 A1 | 3/2012 | Fitz et al. | 385/104 |
| 2013/0062097 A1* | 3/2013 | Hammond | B32B 1/08 174/120 SR |
| 2013/0072626 A1* | 3/2013 | Chen | 524/584 |

OTHER PUBLICATIONS

U.S. Appl. No. 14/099,921, filed Dec. 7, 2013, Mario Sergio Sandate Aguilar, 35 pages.
U.S. Appl. No. 14/192,007, filed Feb. 27, 2014, Warren W. McAlpine, 18 pages.
U.S. Appl. No. 14/231,875, filed Apr. 1, 2014, Michael Emmerich, 38 pages.
U.S. Appl. No. 61/892,534, filed Oct. 18, 2013, Bradley J. Blazer, 42 pages.
U.S. Appl. No. 61/921,769, filed Dec. 30, 2013, Anne G. Bringuier, 30 pages.
U.S. Appl. No. 61/921,777, filed Dec. 30, 2013, Warren W. McAlpine, 56 pages.
U.S. Appl. No. 61/921,755, filed Dec. 30, 2013, David Wesley Chiasson, 42 pages.
U.S. Appl. No. 61/921,763, filed Dec. 30, 2013, William Carl Hurley, 45 pages.
Marik, J., "Advanced SZ Stranding Technology for Enhanced Applications," 4 pages, Last accessed on Feb. 21, 2014 from http://rosendahlaustria.com/custom/rosendahlaustria/Rosendahl__Products__PDF/1062003111324__p1__.pdf.
Rechberger, M., Hörschläger, W., "Buffering & SZ-Stranding Process for Compact Dry Tube FO-Cable," *Proceedings of the 56th Annual International Wire & Cable Symposium*, 2007, -pp. 614-617, Last accessed on Feb. 24, 2014 from http://ecadigitallibrary.com/pdf/IWCS07/15__5.pdf.

\* cited by examiner

FIBER OPTIC CABLE WITH EXTRUDED TAPE

BACKGROUND

Aspects of the present disclosure relate generally to fiber optic cables, and more specifically to fiber optic cables that include water-blocking tapes.

Fiber optic cables, especially those designed for outdoor environments, typically include water-blocking components to limit the flow of water through the cables. Some cables use "dry" water-blocking components, such as water-swellable tapes and yarns that carry super-absorbent polymers (SAP). When exposed to water, the SAP expand and fills gaps in the cable to block the flow of water through the cable. Water-swellable tapes typically include layers of nonwoven material, such as polyester fiber, that are laminated together, with the SAP between the layers or coated on or adhered thereto. Similarly water-swellable yarns are typically coated with super-absorbent material.

Water-swellable tapes and yarns are typically supplied on reels or spools, and the tapes and yarns are drawn into the core of a cable during manufacturing, such as when other components are joined together in stranding, when a tube is extruded around the components, and/or when the cable is jacketed. As the tapes and yarns are pulled from the reels and spools, water-swellable materials may break loose and fall from the tapes and yarns, such as on to the floor of the corresponding manufacturing facility. Also, when cable components, such as unjacketed cable cores are moved within a manufacturing facility or into inventory, the water-swellable materials may also break loose and fall from the tapes and yarns.

In environments that have humidity, the loose water-swellable materials may absorb water from the air and expand. As such, the loose powders may become quite messy in the manufacturing facility. Other components of cables, such as fire-retardant tapes that carry fire-retardant powder particles may behave similarly. A need exists for cleaner way to make fiber optic cable, and fiber optic cable components such as cable cores, that do not drop or drop fewer powder particles, such as water-swellable powder, in a manufacturing facility or elsewhere.

SUMMARY

One embodiment relates to a method of manufacturing a fiber optic cable. The method includes a step of extruding a tape, where the extruded tape includes water-swellable material integrated therewith. The method includes another step of incorporating the extruded tape with core items of the fiber optic cable, where the core items include one or more optical fibers. The method includes yet another step of extruding a jacket around the extruded tape and core items. Accordingly the water-swellable material of the extruded tape is configured to limit water from flowing lengthwise along the fiber optic cable through one or more gaps among the core items.

Use of an extruded tape may alleviate the problem of loose water-swellable material debris, such as by forming the extruded tape on the manufacturing line, reducing exposure of the tape, and/or by securely integrating the water-swellable material with the extruded tape so that the material does not break loose. Additionally, use of extruded tape solves other problems in the fiber optic cable industry and provides additional benefits independent of the cleanliness of the extruded tape, as discussed below and as may be apparent to those of skill in the art.

Another embodiment relates to a fiber optic cable, which includes a tape including a substrate of an extrudable thermoplastic, core items of the fiber optic cable, and a jacket around the tape and core items. The tape includes water-swellable material integrated therewith. The core items include one or more optical fibers, and the tape is incorporated with core items. Accordingly, the water-swellable material of the tape is configured to limit water from flowing lengthwise along the fiber optic cable through one or more gaps among the core items.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
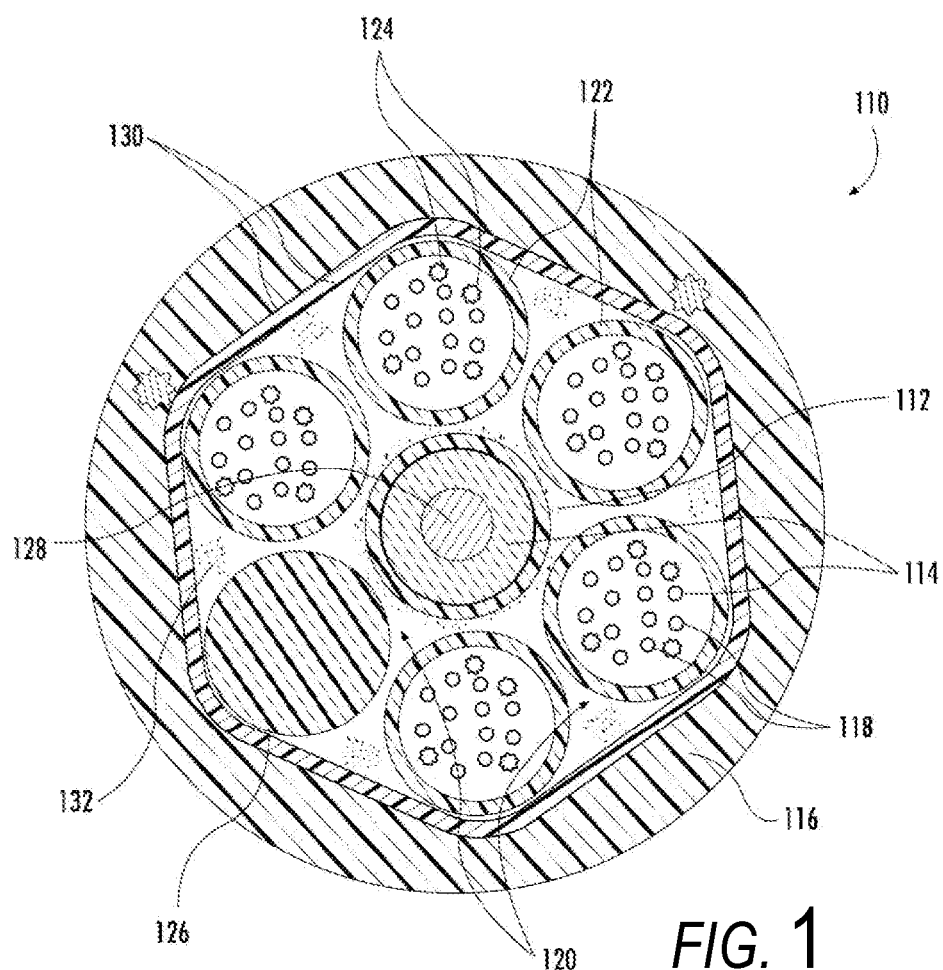
FIG. 1 is a cross-sectional view of a fiber optic cable according to an exemplary embodiment.

Referring to FIG. 1, a fiber optic cable 110 includes a tape 112 (e.g., piece, element, feature, component) including a substrate of an extrudable thermoplastic, core items 114 of the fiber optic cable 110, and a jacket 116 around the tape 112 and core items 114. The tape 112 includes water-swellable material integrated therewith. The core items 114 include one or more optical fibers 118, and the tape 112 is incorporated with core items 114. As such, the water-swellable material of the tape 112 is configured to limit water from flowing lengthwise along the fiber optic cable 110 through one or more gaps 120 among the core items 114.

According to an exemplary embodiment, the core items 114 of the cable include buffer tubes 122 containing the optical fiber 118. The buffer tubes 122 disclosed herein may include polypropylene, polyvinyl chloride, polycarbonate, polybutylene terephthalate, and/or other polymers. Fillers, additives, and other components may be added to the polymers. In some embodiments, in addition to the optical fibers 118, the buffer tubes 122 are filled with a filling compound, such as a grease or petroleum-based gel. The filling compound water-blocks the buffer tubes 122 and provides coupling between the optical fibers 118 and the buffer tubes 122. The buffer tubes may also or alternatively contain yarn 124 and/or other elements. The yarn 124 may be strength yarn, such as aramid or fiberglass, and/or may carry water-swellable material, such as a nonwoven yarn carrying super-absorbent polymer, as discussed above.

Other core items 114 of the cable 110 may include dummy rods 126, a central strength member 128, binder element(s) 130, additional tapes 132, and other components, such as conductors, ripcords, fire-retardant tapes, heat distribution materials, foam tapes, layers of armor (not shown). Still referring to FIG. 1, the central strength member 128 may be a dielectric strength member, such as an up-jacketed glass-reinforced composite rod. In other embodiments, the central strength member 124 may be or include a steel rod, stranded steel, tensile yarn or fibers (e.g., bundled aramid), or other strengthening materials.

In some embodiments, some of the core items 114, such as the buffer tubes 122 and dummy rods 126, are stranded (i.e., wound) about the central strength member 128. The core items 114 may be stranded in a repeating reverse-oscillatory pattern, such as so-called S-Z stranding (see generally FIGS. 3 and 5), or other stranding patterns (e.g., helical). The binder element(s) 130 may constrain the core items 114 in the stranded configuration, facilitating mid-span or cable-end access of the optical fibers 118 and cable bending.

In other contemplated embodiments, the core items 114 are non-stranded. In some such embodiments, the core items 114 include micro-modules or tight-buffered optical fibers that are oriented generally in parallel with one another inside the binder element(s) 130. For example, harness cables and/or interconnect cables may include a plurality of micro-modules, each including optical fibers 118 and tensile yarn (e.g., aramid), where the micro-modules are bound together by the binder element(s) 130. Some such cables may not include the central strength member 128.

According to an exemplary embodiment, the buffer tubes 118 have an outer diameter that is 3 millimeters or less, such as 2.5 millimeters or less, or even 2 millimeters or less. The buffer tubes 118 may have an average wall thickness of at least 100 micrometers, such as at least 200 micrometers, and/or less than a millimeter. As the number of optical fibers 118 increases for the same size buffer tube 118, the freedom of the optical fibers 118 therein to bend and have excess optical fiber length decreases. Each buffer tube 122 may include at least one optical fiber 118, such as at least four optical fibers 118, such as at least twelve optical fibers 118. As may be apparent, the size of gaps 120 between the buffer tubes is related to the size of the buffer tubes, and the size of gaps within the buffer tubes is again related to the size of the buffer tubes as well as the number of optical fibers contained therein.

According to an exemplary embodiment, the optical fibers 118 include a glass core immediately surrounded by a glass cladding, which is immediately surrounded by one or more layers of a polymer coating, such as softer, stress-isolation layer of acrylate immediately surrounded by a harder shell of acrylate. According to an exemplary embodiment, the optical fibers 118 are individual, discrete optical fibers, as opposed to optical fibers of a fiber optic ribbon. In other embodiments, ribbons and/or stacks of ribbons are included (see generally FIG. 4). The optical fibers 118 may be single mode optical fibers, multi-mode optical fibers, multi-core optical fibers, plastic optical fibers, optical fibers having a uniform cladding, and/or other types.

The optical fibers 118 may be bend-resistant optical fibers having a cladding that includes annular layers of differing refractive indices or other types of bend-resistant optical fibers. An example of a bend-insensitive, or bend resistant, optical fiber is ClearCurve® Multimode fiber commercially available from Corning Incorporated of Corning, N.Y. In some such embodiments, when bent into a coil having a single turn with a diameter of about 200 millimeters, the optical fibers 118 have a change in optical attenuation (delta attenuation) at 1310 nanometers of about 0.1 dB or less per turn, and more preferably about 0.03 dB or less per turn, where the above delta attenuation is observed at one or wavelengths preferably greater than or equal to 1500 nm, in some embodiments also greater than about 1310 nm, in other embodiments also greater than 1260 nm. Use of bend-resistive optical fibers may facilitate improved optical performance of the associated cable, such as when the buffer tubes are particularly small and highly packed with optical fibers 118.

According to an exemplary embodiment, the tape 112 includes (e.g., is formed from, is formed primarily from, has some amount of) a polymeric material, such as a thermoplastic. In various embodiments, the tape 112 includes polyethylene (e.g., low-density polyethylene, medium density polyethylene, high-density polyethylene), polypropylene, polyurethane, or other polymers. In some embodiments, the tape 112 includes at least 70% by weight polyethylene, and may further include stabilizers, nucleation initiators, fillers, fire-retardant additives, reinforcement elements (e.g., chopped fiberglass fibers), and/or combinations of some or all such additional components or other components. In contemplated embodiments, the tape 112 may include UV-cured material, such as acrylate.

According to an exemplary embodiment, the tape 112 is formed from a material having a Young's modulus of 3 gigapascals (GPa) or less, thereby providing a relatively high elasticity or springiness to the tape 112 so that the tape 112 may conform to the shape of the core items 114 and not overly distort the core items 114 or form additional gaps. In other embodiments, the the tape 112 is formed from a material having a Young's modulus of 5 GPa or less, 2 GPa or less, or a different elasticity, which may not be relatively high.

Extruded thermoplastic tapes, as disclosed herein, may be substantially thinner than nonwoven tapes, allowing for a narrower cable and a corresponding reduction in other materials of the cable 110, such as jacket material. Use of a relatively thin tape 112 additionally allows for rapid cooling (e.g., on the order of milliseconds) of the tape 112 during manufacturing and thereby allowing the tape 112 to quickly be able to hold tension around the core items 114, such as without substantially deforming when wrapped around the core items 114.

According to an exemplary embodiment, the tape 112 is thin, such as 0.5 mm or less in thickness (i.e., average thickness; e.g., about 20 mil or less in thickness, where "mil" is 1/1000th inch). In some such embodiments, the tape 112 is 0.2 mm or less (e.g., about 8 mil or less), such as greater than 0.05 mm and/or less than 0.15 mm. In some embodiments, the tape 112 is in a range of 0.4 to 6 mil in thickness, or another thickness. In contemplated embodiments, the tape 112 may be greater than 0.5 mm and/or less than 1.0 mm in thickness. In some cases, for example, the tape 112 has roughly the thickness of a typical garbage bag.

According to an exemplary embodiment, the jacket 116 is polymeric (e.g., includes polyvinyl chloride, polyethylene, and/or other materials). In some embodiments, when comparing average cross-sectional thicknesses, the jacket 116 is thicker than the tape 112, such as at least twice as thick as the tape 112, at least ten times as thick as the tape 112, at least twenty times as thick as the tape 112. In other contemplated embodiments, the jacket 116 may be thinner than the tape 112, such as with a 0.4 mm nylon skin-layer jacket extruded over a 0.5 mm tape 112. The thickness of the tape 112 may be less than a tenth the maximum cross-sectional dimension of the cable 110, such as less than a twentieth, less than a fiftieth, less than a hundredth, while in other embodiments the tape 112 may be otherwise sized relative to the cable cross-section.

In some embodiments, the tape 112 includes first and second lengthwise edges, which extend generally along the length of the cable 110. Between the lengthwise edges, the tape 112 may have a substantially constant thickness (e.g., height, radial distance) such that the thickness deviates less than 25% from an average thickness between the first and second lengthwise edges. In some embodiments, the tape 112 is produced by extruding a thin section of thermoplastic material of desirable width, such as less than the length of the cross-sectional perimeter of the cable 110, such as at least 1 millimeter. In contemplated embodiments, the tape may have a variable thickness and/or width. In some embodiments, the tape may not have a constant thickness. For example, the tape may be extruded to optimally fill interstitial spaces in the cable, and may correspondingly conform to the shape of interstices.

Figure 2:
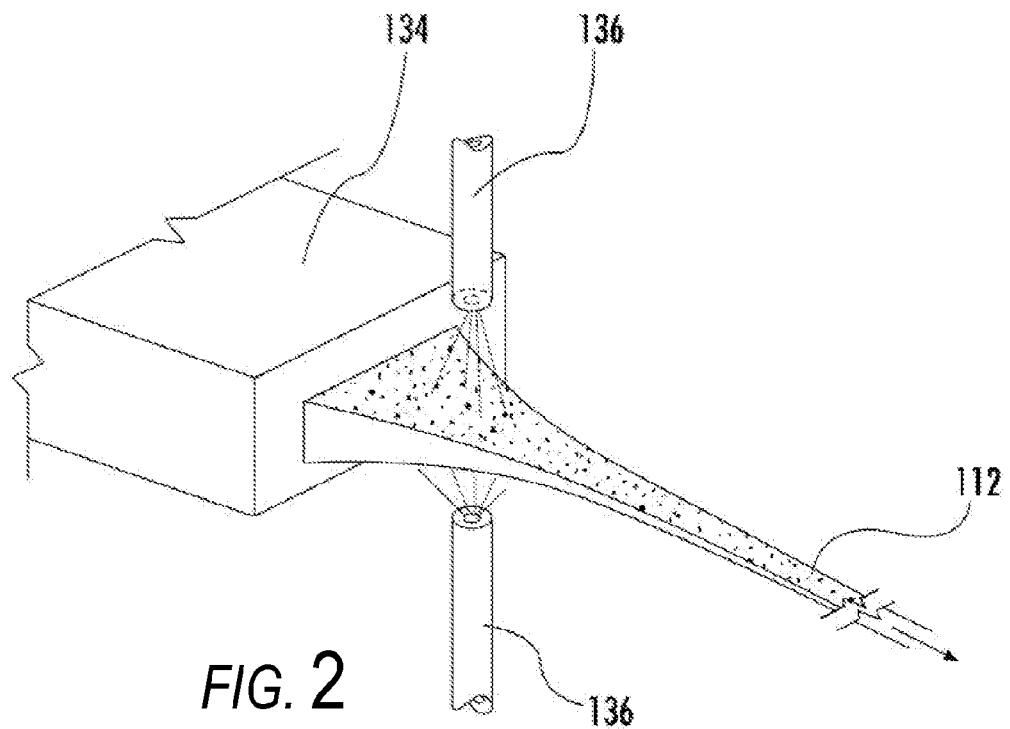
FIG. 2 is a perspective view of tape extrusion according to an exemplary embodiment.
Figure 3:
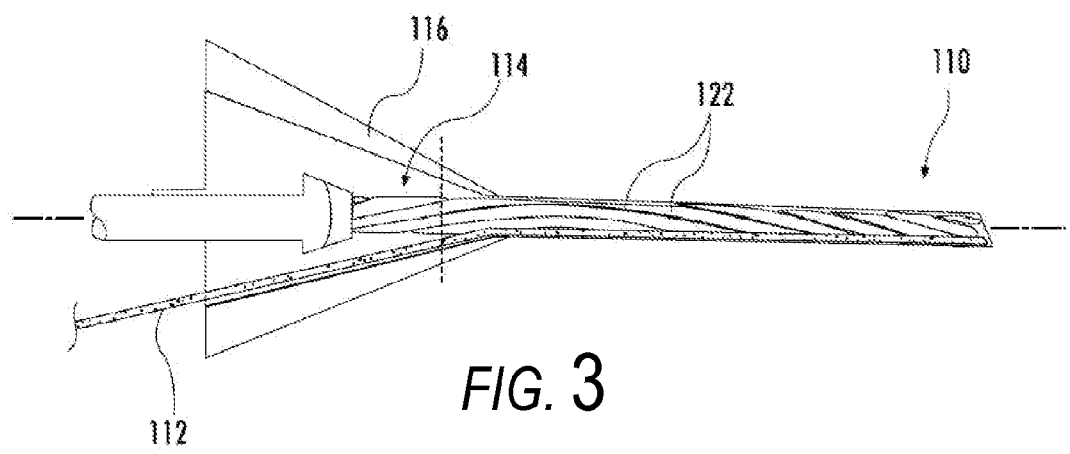
FIG. 3 is a side view of jacket extrusion around the tape of FIG. 2 incorporated with core items of a cable according to an exemplary embodiment.

Referring to FIGS. 2-3, an extruder 134 extrudes the tape 112 and the jacket 116 is also extruded, such as by a separate extruder or via co-extrusion. In some processes of manufacturing the fiber optic cable 110, the tape 112 is extruded in tandem with the jacket 116; and/or with stranding of the core items 114, such as where the tape 112, made from the extrusion process shown in FIG. 2 is directed into the extrusion process of FIG. 3 and incorporated in the cable 110. In other contemplated embodiments, the tape 112 may be separately manufactured and subsequently incorporated with the core items 114 when the jacket 116 is applied, as shown in FIG. 3. In some embodiments, tape may be made by drawing a wick or guide of the tape from a die (e.g., pultrusion). While FIG. 3 appears to show the tape 112 entering the jacket 116 is a straight manner with respect to the length of the cable, in other embodiments, the tape may be helically wound, may be bonded to the buffer tubes and thereby trace the strand profile of the buffer tubes, or may be otherwise arranged in the cable.

According to an exemplary embodiment the powder particles may be attached to the tape 112 by pneumatically spraying the powder particles onto the tape 112 through nozzles 136 or other control elements. Immediately after exiting the die, while the material is still at least partially fluid (e.g., molten, uncured) and prior to completion of the draw, SAP particles or other particles may be applied to the tape 112 with a high velocity jet of air. Momentum of the particles, the partially fluid state of the tape 112, and the draw may all combine to mechanically couple the particles to the substrate of the tape 112 (e.g., polymer substrate discussed above). Put another way, as the substrate material exits the extrusion die, super absorbent particles of sodium or potassium sodium acrylate or acrylamide copolymer may be delivered to the surface with enough momentum to permit the particles to embed in the molten extrudate. In this way only the portion of the particle that it is contact with the film is blocked from exposure to water, which permits the particles to swell very rapidly and to their full potential. By improving the water consumption rate and permitting the full swell height potential to be achieved, the quantity of SAP particles required to water block a section of cable can be reduced relative to less effective arrangements.

Alternatively or in addition thereto, a mixture of powdered adhesive and SAP powder can be applied to the tape for additional adhesive strength. In other embodiment, static electricity or other means may be used to motivate the powder particles to embed in the tape 112 or otherwise couple thereto. In some embodiments, glues or other attachment means are used to attach the powder particles to the tape 112. In contemplated embodiments, the tape passes through rollers, where the rollers have a surface texture. The rollers then press powder into the tape and the texture provides relief permitting larger particles of the powder (e.g., at least 150 micron particle maximum cross-sectional dimension, at least 200 micron) to pass completely through the tape (e.g., 100 micron or less thick) exposing the particle on either side of the tape.

Use of extruded thermoplastic tape 112 as a carrier for water-swellable materials, such as super-absorbent polymer particles, may remove need for binder yarn to hold the water-blocking tape in place, as may be the case with conventional fiber optic cables using traditional nonwoven tapes. For example, in some embodiments as shown in FIG. 3, extrusion of the jacket over and in contact with the tape 112 partially melts the tape 122. In some such embodiments the tape and jacket bond to one another when the jacket cools, anchoring the tape to the jacket, such as with the tapes 132 of FIG. 1. In some embodiments, the bonding is at least in part due to cohesion, where the tape and the jacket include a common polymer, such as polyethylene. In other such embodiments, the tape and/or the jacket includes an adhesive or adhesion promoter, such as maleic anhydride or ethylene acrylic acid. In some embodiments, the tape 112 is bonded to one or more of the core items 114 of the cable 110, such as the central strength member 128 and/or the buffer tubes 122.

Anchoring of the tape 112 to other components of the cable 110 may improve the robustness of the cable and may also help prevent the tape 112 from misalignment or shifting to less optimal positions within the cable 1110, such as when the cable 110 bends or stretches. Further, anchoring the tape 112 to the components of the cable 110, as described, may allow for less tape material to be used because of increased confidence and consistency of the location of the tape 112 within the cable 110. There may be less need for a margin of safety for water-blocking.

In some embodiments the tape 112 of the cable 110 includes powder particles that have an average maximum cross-sectional dimension of 500 micrometers (μm) or less, such as 250 μm or less, 100 μm or less. According to an exemplary embodiment, the powder particles on the tape 112 include super-absorbent polymer particles, and the amount of super-absorbent polymer particles is less than 100 grams per square meter of surface area (g/m$^2$) of the respective tape side to which the powder particles are coupled. In some such embodiments, the amount of super-absorbent polymer particles is between 20 and 60 g/m$^2$, such as between 25 and 40 g/m$^2$.

In some embodiments, at least some of the powder particles 136 are coupled directly or indirectly to the tape 112 (e.g., attached bound directly thereto, adhered thereto, in contact therewith), such as coupled to a surface of the tape 112 and/or coupled to all surfaces of the tape 112. According to an exemplary embodiment, at least some of the powder particles 136 are partially embedded in the tape 112, such as passing partly through a surrounding surface plane of the substrate of the tape 112 while partially projecting away from the surface of the tape 112; or, put another way, having a portion thereof submerged in the tape 112 and another portion thereof exposed.

Figure 4:
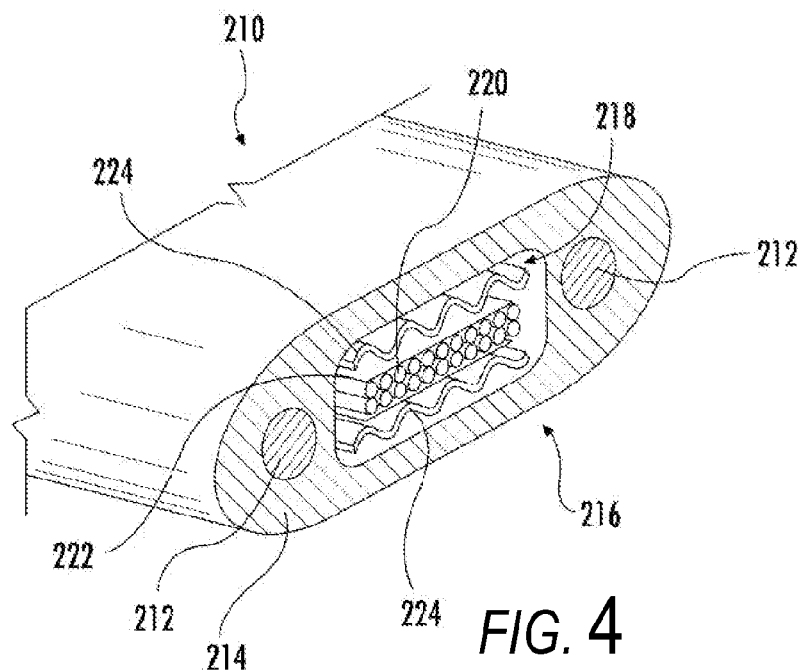
FIG. 4 is a perspective view of a fiber optic cable according to another exemplary embodiment.

Referring to FIG. 4, a fiber optic cable 210 includes a jacket 214 with embedded strength members 212 (e.g., rods, glass-reinforced plastic rods, steel rods). In some embodiments, the jacket 214 may have flat sides 216 as shown. In other embodiments the jacket may be round in cross-section, or otherwise shaped. According to an exemplary embodiment, the jacket 214 defines a cavity 218 with optical fibers 220 and/or other core items extending therethrough. In some embodiments, the optical fibers 220 are arranged as one or more fiber optic ribbons 222. In some such embodiments, the fiber optic ribbons 222 are arranged in a stack, where the extruded tapes 224, as described herein, are positioned on the top and bottom of the one or more fiber optic ribbons 222, as shown in FIG. 4.

According to an exemplary embodiment, the extruded tape 224 includes water-swellable material integrated therewith, as discussed above, and may also include a lubricant integrated therewith to influence coupling of the core items, such as coupling of the ribbon(s) 222 with the jacket 214. In some such embodiments, the lubricant is a solid powder lubricant, such as talcum powder, graphite, or another material, which may be partially embedded in the tape 224 according to the processes disclosed herein.

In other embodiments, the tape 224 includes a low-adhesive material or low-tack adhesive integrated therewith, such as a powder adhesive and/or "repositionable" or "temporary" adhesives (e.g., commercially available POST-IT GLUE STICK from 3M, EASY-TACK™ Repositionable Adhesive from Krylon, SCOTCH® Restickable Glue Stick from 3M). Lubricant or adhesive may be mixed with water-swellable powder or fiber-retardant powder (e.g., magnesium hydroxide and/or aluminum tri-hydrate powder) and integrated with the tape 224.

In some embodiments, the ribbon(s) have a positive "excess ribbon length," meaning that the length of the ribbons is longer than the length of the corresponding section of cable because the ribbons undulate or are otherwise contorted in the cavity of the jacket. The coupling of the ribbons to the jacket is such that the ribbons move within the jacket as the cable stretches and contract, such as due to tensile loading or changes in environmental temperature; but when the cable 210 is laying straight at a length of at least 50 meters and is cut to have a free end, the ribbons spring from the cable end by a positive distance (e.g., at least a sixteenth of an inch) but less than four inches, such as less than even two inches, and instead substantially maintain the excess ribbon length throughout the overall cable. Similarly, the ribbons do not largely spring out from the cavity when the cable is mid-span accessed, facilitating access and routing of optical fibers of the cable via tap points for distribution of the optical fibers in networks.

Figure 5:
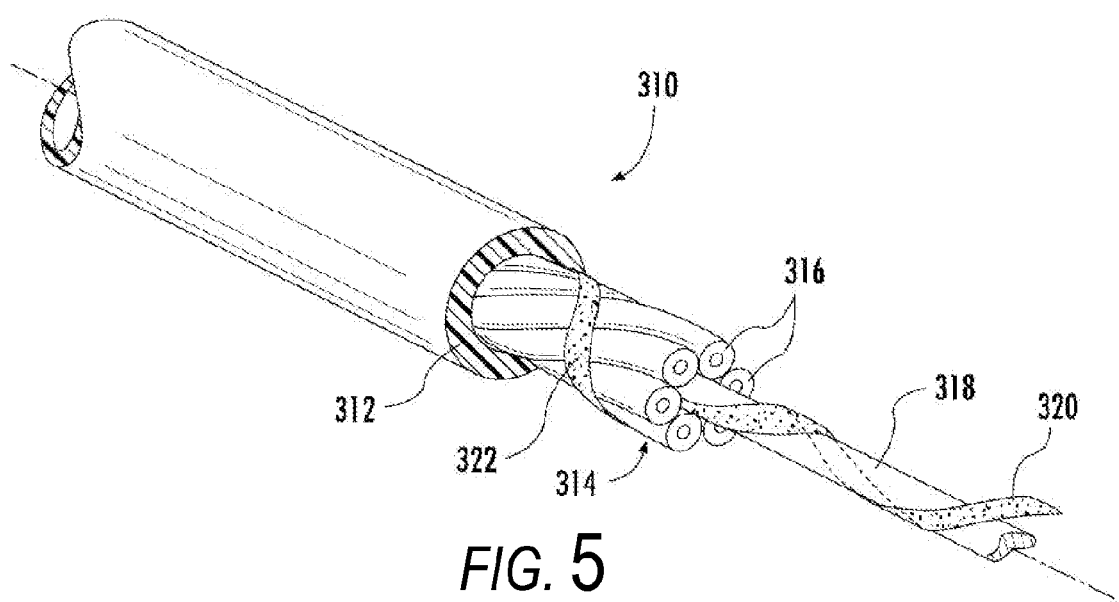
FIG. 5 is a perspective view of a fiber optic cable according to yet another exemplary embodiment.

Referring to FIG. 5, a loose tube cable 310, similar to the cable 110 of FIGS. 1-3 includes a jacket 312 surrounding core items 314, such as buffer tubes 316 containing optical fibers and stranded around a central strength member 318. Extruded tape 320, 322, as disclosed herein such as with water-swellable material, is included with the cable 310. Instead of laying the tape 320, 322 straight along the length of the cable 310, as shown in FIG. 3, the tape 320, 322 of the cable 310 is helically wrapped around the core items 314. More specifically, at least one tape 320 is wrapped around the central strength member 318 and/or at least another tape 322 is wrapped around two or more of the buffer tubes 316.

In some such embodiments, additional tapes are also included, such as a second tape adjoining the central strength member 318 and/or surrounding the buffer tubes 316. The second tape on the central strength member 318 and/or surrounding the buffer tubes 316 may be counter-helically wrapped or laid straight and may work in conjunction with the tapes 320, 322 shown in FIG. 5 for water blocking or other functions. In contemplated embodiments, the tape 320, 322 may be made of a particularly strong thermoplastic or may be reinforced with tensile fibers (e.g., aramid), and may additionally function as an extruded binder for the buffer tubes 316 or other cable components (e.g., subunits, micromodules), holding the buffer tubes 316 together and/or in a particular stranding arrangement.

In an example, generally corresponding to tapes 112, 132, 224, 320, 322 disclosed herein, SAP particles in the size range 1 nm to 63 μm are applied to an extruded polymer (e.g., polyethylene) tape. Following extrusion and cooling, the finished thickness of the tape is about 0.1 mm (e.g., between 50 μm and 150 μm) and the width is about 3 mm (e.g., between 2.5 mm and 3.5 mm). The concentration of powder is about 10 mg/m/side (e.g., between 5 and 15 mg/m/side of the tape). The powder is applied with a nozzle 136 exit velocity of about 115 m/s (e.g., at least 80 m/s) to molten polymer that is at a temperature above about 200° C. (e.g., between about 180° C. and 1000° C.) that is being drawn at about a 20:1 ratio (e.g., between 15:1 and 25:1).

In another example, a tape, generally corresponding to tapes 112, 132, 224, 320, 322 disclosed herein, is pulled through two or more pinch rollers to provide consistent dimensions to the tape. SAP or other powder is applied and pressed into each side of the tape by the rollers as it passes through the rollers under their applied pressure (e.g., textured rollers disclosed above). The SAP may be applied prior to the roller or may be statically charged and attracted to the circumference of the rollers, or may be otherwise applied. The tape may be air cooled and may pass directly to a jacketing process, as shown in FIG. 3; or may be temporarily stored, such as being wound onto a bobbin to be used in a separate process such as loose tube cable stranding.

In yet another contemplated embodiment, generally corresponding to tapes 112, 132, 224, 320, 322 disclosed herein, SAP or other powder is compounded into the thermoplastic and then extruded them as one. From the extruder, the tape is drawn down to a thickness less than the thickness of some of the powder particle, permitting water to contact the particle surface and permitting the water to be absorbed by the particle. In some such embodiments, the thermoplastic may be selected to micro-fracture or otherwise provide access to the SAP particles.

Alternatively, water-swellable materials, that have been reduced to particles by milling or grinding and that have nominal sizes ranging from 150 to 400 µm, can be used, where these particles are substantially larger than the thickness of the tape, generally corresponding to tapes 112, 132, 224, 320, 322 disclosed herein. The large particles are then applied to the tape with enough momentum or through compressive forces (e.g., via rollers) so that the large particles penetrate the tape and which exposes the particle on each side of the tape. Alternatively still, sharp particle shards in this size range can be used to facilitate severing the tape to provide exposure to the particles compounded therein.

In addition to cleanliness in manufacturing of fiber optic cable with the extruded tapes disclosed herein, extruded tapes may have other advantages over many conventional tapes. First, for example, extruded tapes may provide an impermeable water barrier. Combined with the bonding techniques disclosed above, this impermeable barrier may be used to seal off or compartmentalize internal sections of the fiber optic cable, such as interstices. Second, extruded tape sections with SAP may be thinner than traditional nonwoven sections, as discussed above, allowing for a narrower, more-resource efficient overall cables. Third, extruded tapes with SAP can use hydrophobic materials such as polypropylene and polyethylene moisture barriers which do not promote wicking. Fourth, extruded tape sections of flame retardant materials (e.g., filled polyvinyl chloride) with SAP and/or flame-retardant particles can provide a bridge between indoor/outdoor cabling applications. Fifth, extruded tapes, generally corresponding to tapes 112, 132, 224, 320, 322 disclosed herein, may replace polyester or aramid binders, as discussed above with regard to FIG. 5.

Figure 6:
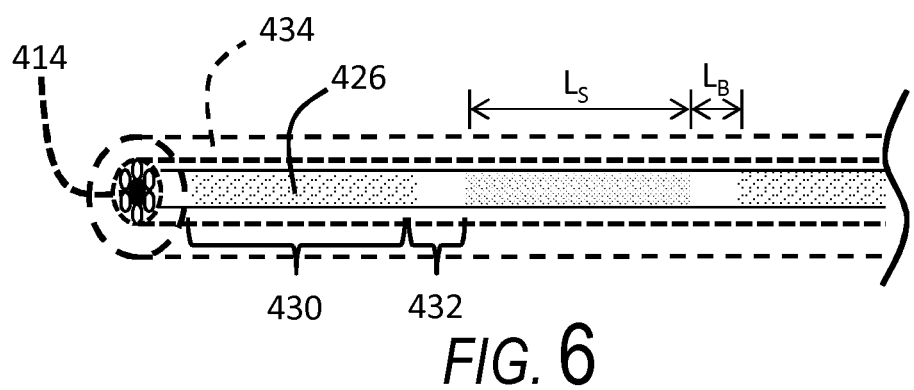
FIG. 6 is a perspective view of a fiber optic cable according to yet another exemplary embodiment.

Referring now to FIG. 6, the cable core 414 includes and/or adjoins a tape 426, as discussed above. The tape 426 includes segmented lengths 430 supporting water-blocking powder as disclosed herein, spaced apart by bare lengths 432 without powder or with considerably less powder. According to an exemplary embodiment, the bare lengths 432 form a complete band or loop radially around the perimeter of the tape (i.e., around both sides) tape 426 to isolate or parse the adjoining segments 430 that support water-blocking powder. The shape of the segments 430, 432 may be non-uniform instead of necessarily rectangular, as shown. As mentioned, the tape 426 may be formed from a polymer, such as a thin film of extruded polyethylene, polypropylene, etc., which does not wick water through itself; in contrast to many nonwoven materials that may form conventional water-swellable tapes and yarns. Although shown with the cable core 414, any of the tapes disclosed herein may include the segmented lengths 430, 432 to impede slow migration of water through a cable.

As such, slow water migration in the presently disclosed cables may be blocked by the intermittent and isolated spacing of the segmented lengths 430 supporting water-blocking powder. For example, if a jacket 434 of the cable is breached, water-swellable powder of a segment 430 may absorb water entering the jacket 434 and clog or block off the flow path for the water within the cable. Because the underlying film material (substrate) is non-wicking, slow migration of the water halts or is greatly reduced in rate of propagation at the end of a segment 430 and/or upon reaching the adjoining bare lengths 432 that do not wick.

The length $L_B$ of the bare section 432 is long enough so that the fully expanded powder (e.g., sodium polyacrylate powder, super-absorbent polymer powder) does not swell and extend between segments 430 supporting water-blocking powder. This distance may vary depending upon the interior free space of the cable, the concentration of water-swellable powder, and the absorption capacity of the particular type of water-swellable powder. In some embodiments, the average length $L_B$ of bare segments 432 (i.e. distance between segments 432 supporting water swellable powder) for a 100 meter section of the cable is at least 10 mm, such as at least 50 mm. The bare segments 432 can be manufactured by temporarily blocking or rerouting the flow of water-swellable powder delivered to the extrusion output, as shown in FIG. 3. The average length $L_S$ of the water-blocking segments 430 may be at least 10 mm, such as at least 50 mm.

According to an exemplary embodiment, the powder particles of the segments 430 include super-absorbent polymer particles, and the amount of super-absorbent polymer particles is at least 20 and/or less than 100 grams per square meter of tape side surface area ($g/m^2$) to which the powder particles are coupled. In some such embodiments, the amount of super-absorbent polymer particles is between 20 and 60 $g/m^2$, such as between 25 and 40 $g/m^2$. In the bare segments 432, the concentration of powder is substantially less, such as less than 10 $g/m^2$, such as less than 5 $g/m^2$, where the lesser concentration reduces the rate of slow migration of water through the cable passing between individual particles of powder.

The construction and arrangements of the fiber optic cables, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. For example, the extruded tape, used as a binder of buffer tubes or other core items of a cable as disclosed in embodiments above, need not have water-swellable or fire-retardant material integrated therewith, especially if the corresponding cable does not require water-swellable or fire-retardant components for the intended use of the cable or if the water-blocking and fire-retardant functions are performed by other components of the cable, such as water-blocking yarns and/or other tapes, which may be used in conjunction with the extruded tape. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A method of manufacturing a fiber optic cable, comprising steps of:
   extruding a tape;
   applying a water-swellable material to the tape after extruding the tape;
   incorporating the extruded tape with core items of the fiber optic cable, wherein the core items include one or more optical fibers; and
   extruding a jacket around the extruded tape and core items, whereby the water-swellable material of the extruded tape is configured to limit water from flowing lengthwise along the fiber optic cable through one or more gaps among the core items.

2. The method of claim 1, wherein the water-swellable material is applied by blowing the water-swellable material onto a surface of the tape while the tape is still tacky from the extruding.

3. The method of claim 2, wherein the water-swellable material comprises powder particles of super-absorbent polymer.

4. The method of claim 3, wherein the applying further comprises partially-embedding the powder particles in the tape such that portions of the powder particles are submerged in a substrate material of the tape and other portions of the powder particles project outward from the surface of the tape.

5. The method of claim 1, wherein the core items include buffer tubes and a central strength member, wherein the buffer tubes are stranded around the central strength member, and wherein the one or more optical fibers are positioned within the buffer tubes.

6. The method of claim 5, wherein the incorporating step includes wrapping the tape around at least some of the core items.

7. The method of claim 6, wherein the tape is wrapped helically around a group of more than one of the buffer tubes.

8. The method of claim 1, wherein the core items include fiber optic ribbons that include the one or more optical fibers, and wherein the incorporating step includes sandwiching the fiber optic ribbons between the tape and a second extruded tape also with water-swellable material.

9. The method of claim 1, further comprising a step of anchoring the tape to an interior surface of the jacket.

10. The method of claim 9, wherein a substrate material of the tape comprises a thermoplastic and the jacket also comprises the thermoplastic, thereby facilitating cohesive bonding between the jacket and tape.

11. The method of claim 1, further comprising a step of anchoring the tape to one or more of the core items of the cable.

12. The method of claim 1, wherein the tape includes first and second lengthwise edges.

13. The method of claim 12, wherein the tape has a substantially constant thickness between the first and second lengthwise edges such that the thickness deviates less than 25% from an average thickness between the first and second lengthwise edges.

14. The method of claim 1, wherein the steps of extruding the tape, applying the water-swellable material and extruding the jacket occur in tandem along a manufacturing line.

15. A fiber optic cable, comprising:
a tape comprising a substrate of an extrudable thermoplastic, wherein the tape includes water-swellable material integrated therewith, wherein the water-swellable material comprises particles of super-absorbent polymer embedded in the substrate of the tape such that portions of the particles are submerged in the substrate of the tape and other portions of the particles project outward from the surface of the tape;
core items of the fiber optic cable, wherein the core items include one or more optical fibers, and wherein the tape is incorporated with the core items; and
a jacket around the tape and core items, whereby the water-swellable material of the tape is configured to limit water from flowing lengthwise along the fiber optic cable through one or more gaps among the core items.

16. The cable of claim 15, wherein the tape is anchored to an interior surface of the jacket, wherein the jacket comprises the extrudable thermoplastic, and wherein the jacket and tape are cohesively bonded to one another.

17. The cable of claim 15, wherein the core items include buffer tubes and a central strength member, wherein the buffer tubes are stranded around the central strength member, wherein the one or more optical fibers are positioned within the buffer tubes, and wherein the tape is wrapped around at least some of the core items.

18. The cable of claim 17, wherein the tape is wrapped helically around a group of more than one of the buffer tubes.

19. The cable of claim 18, wherein the tape includes first and second lengthwise edges, and wherein the tape has a substantially constant thickness between the first and second lengthwise edges such that the thickness deviates less than 25% from an average thickness between the first and second lengthwise edges.

20. The cable of claim 15, wherein the thermoplastic material of the tape is an elastic material having a Young's modulus of 3 GPa or less.

* * * * *